United States Patent Office 2,967,176
Patented Jan. 3, 1961

---

2,967,176

PROCESS FOR POLYMERIZATION OF ETHYLENE

Frank L. Pilar, Durham, N.H., assignor to Standard Oil Company, Chicago, Ill., a corporation of Indiana No Drawing. Filed Oct. 31, 1957, Ser. No. 693,532

3 Claims. (Cl. 260—94.9)

This invention relates to novel catalytic processes for the polymerization of various olefins and to novel catalysts and their preparations for use in the aforesaid polymerization processes. In particular, this invention provides novel catalysts and processes for the polymerization of ethylene at a high rate at low temperatures and pressures to form normally solid polymers having high densities.

One object of my invention is to provide novel catalytic polymerization processes, especially suitable for the polymerization of terminal vinyl alkenes containing 2 to 8 carbon atoms, inclusive, per molecule. Another object is to provide novel catalytic processes to prepare crystalline resins. A further object is to increase the rate of alkene polymerization by the employment of catalysts prepared by novel techniques. Yet another object is to provide novel catalysts for the aforesaid processes and to provide methods for the preparation of such catalysts. These and other objects of my invention will become apparent from the following description thereof.

Briefly, I have discovered that easpecially active catalysts for the polymerization of alkenes and the like can be prepared by the interaction of an alkali metal (or equivalent) with a polyvalent metal salt of a metal of Group 4a of the Mendeleef Periodic Table (ore equivalent) in the presence of a 1-arylethylene compound which is present in a concentration between about 0.1 and about 10 mols per mol of said polyvalent metal salt. In one very desirable method of catalyst preparation, which produces catalysts of exceptional polymerization activity, a normally solid complex of the polyvalent metal salt is formed with the 1-arylethylene compound and this complex is then treated with alkali metal or the like under conditions to effect reaction with said complex. The reaction of alkali metal with said complex results, for one thing, in partial reduction of the positive valence of the transition metal. The 1-arylethylene compound facilitates reaction between the alkali metal and the polyvalent metal salt but, possibly more important, the presence of the 1-arylethylene compound in the finished catalyst appears greatly to activate the catalyst when it is used for the polymerization of various alkenes, conjugated alkadienes or their mixtures. In more detail, my invention can be described and illustrated as follows.

The catalysts are prepared from polyvalent metal salts of transition metals of Groups 4, 5, 6 or 8 of the Mendeleef Periodic Table or their mixtures, namely, salts of Ti, Zr, Hf, Th, V, Nb, Ta, U, Cr, Mo, W, Mn, Fe, Co, Ni, Ru, Rh, Pd Os Ir Pt or mixtures of salts of said metals. We can employ the metal salts of various mineral acids for example, the hydrohalogen acids; oxyhalides, e.g., titanyl chloride or vanadyl chloride and the like; salts of acids of phosphorus, sulfur, nitrogen, etc. We may also use cyanides, cyanates, isocyanates, thiocyanates, isothiocyanates, azides, etc. of the specified metals. The salts of carboxylic or sulfonic acids may also be used. Also, we may use metal derivatives, classified herein as salts, having the formula M(OR)$_n$, wherein M represents the polyvalent metal, R is an alkyl or aryl radical, and $n$ is the valence of M, for example.

Ti(OC$_2$H$_5$)$_4$, Ti(OC$_3$H$_7$)$_4$, Ti(OC$_4$H$_9$)$_4$ tetra-2-ethylhexyl titanate, tetrastearyl titanate, tetraphenyl zirconate and the like, for example, the metal derivatives of the enol forms of acetylacetone, acetoacetic ester and the like.

The polyvalent metal salts are allowed to react with an alkali reagent which is selected from the class consisting of alkali metal, alkali metal hydride, hydrocarbon derivatives of the aforesaid alkali metals and mixtures of the aforesaid alkali reagents. More specifically, I can use any one of the alkali metals or alloys, namely, lithium, sodium, potassium, rubidium, cesium; Na-K liquid alloys; lead-sodium alloys such as PbNa$_4$ and the like. The alkali metal hydrides, which have the general formula MH, wherein M is the alkali metal, can be employed in the practice of this invention. The alkali metals form a variety of hydrocarbon derivatives having the general formula MR, wherein R represents a monovalent hydrocarbon radical which may be saturated or unsaturated, for example, an alkyl, aryl, aralkyl, alkaryl, cycloalkyl or other hydrocarbon radicals. Thus, suitable alkyl radicals include methyl, ethyl, propyl, isopropyl, butyl, isobutyl, amyl, octyl, dodecyl, hexadecyl, octadecyl, eicosyl, and the like, for example, as in ethyl sodium, methyl lithium, butyl lithium, methyl sodium, octyl potassium. Other suitable alkali metal compounds include, for example, cumyl potassium, benzyl sodium, allyl sodium, etc.

The 1-arylethylene compounds which are used for the purposes of my invention have the general formula

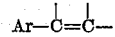

wherein Ar represents an aryl group and the free or "dangling" valences are joined to groups which may be the same or different but which are selected from the class consisting of hydrogen, hydrocarbon radicals and substituted hydrocarbon radicals. The Ar group can be substituted further by hydrocarbon radicals, halogen atoms, alkoxy radicals, aryloxy radicals, etc. Examples of suitable Ar groups include phenyl; alkylphenyl such as tolyl, xylyl, isopropylphenyl, pseudocumyl, ethylphenyl; cyclohexylphenyl, phenylphenyl, chlorophenyl, or other halophenyls such as bromophenyl, naphthyl, methylnaphthyl, dimethylnaphthyl, etc. Thus, for example, I can employ such 1-arylethylene compounds as styrene, alpha-methylstyrene, para-methylstyrene, tert-butylstyrene, allyl benzene (which isomerizes to beta methylstyrene), indene and alkylindenes such as 1-methylindene, 2-methylindene, 4-alkylindenes, 5-alkylindenes, etc.; stilbene or derivatives; or mixtures of the aforesaid 1-arylethylene compounds or the like.

It is not intended to imply that the efficiency of all these 1-arylethylene compounds is precisely the same, but they may, in general, be employed for the purposes of my invention. Styrene and indene are readily available, exhibit good promoting efficiency and are therefore usually preferred, as a practical matter, for use in my invention.

The molar ratio of the alkali reagent to the polyvalent metal salt can be varied over a broad range, for example, about 0.1 to about 10. It is generally preferred to employ a molar excess of the alkali reagent with respect to the polyvalent metal salt in the preparation of the catalysts. The molar ratio of the 1-arylethylene compound to the polyvalent metal salt is selected within the range of about 0.01 to about 10, although somewhat more or less of the 1-arylethylene compound can be used relative to the polyvalent metal salt, depending upon the degree of activation desired in the finished polymerization catalyst.

The catalysts are prepared readily at a high rate even by room temperature contacting of the catalyst components. In general, temperatures can be selected within the range of about −20° C. and about 200° C. For practical purposes I usually employ the temperature range of about 0 to 100° C., preferably about 25 to about 75° C.

The catalyst components can be brought together and contacted in any suitable manner, for example, by grinding the catalyst components in a ball mill or the like. Usually it is preferred, for reasons of convenience in catalyst preparation and transfer, to effect the preparation in the presence of a substantially inert liquid medium, for example, a saturated hydrocarbon which is employed in the liquid or liquefied condition (propane, butane, pentane, hexane, heptane, octane, isooctane, dodecane, cyclopentane, cyclohexane, methylcyclohexane, or their mixtures, or the like); or by the use of aromatic hydrocarbons or the like (such as benzene, toluene, ethylbenzene, xylenes, mesitylene, chlorobenzene, ortho-dichlorobenzene or the like); or by the use of various halogenated acyclic hydrocarbons such as completely halogenated alkanes, e.g., $CF_2Cl—CF_2Cl$, $CFCl_2—CF_2Cl$, $CCl_4$, or partially halogenated alkanes, e.g., $CH_2Cl_2$ and $CHCl_3$. The proportion of inert liquid solvent based upon the catalyst components can fall within the range of about 0.1 to about 20 parts by weight or even more, this being a matter merely of choice, bearing in mind requirements of ease of handling of the produced catalyst suspension, ease of contacting, etc.

The preparation of the catalyst can be effected in the presence of various solid materials, such as carbon, silica, alumina, bauxite, fluoridized alumina, synthetic or natural aluminosilicates, magnesia, titania, zirconia, powdered aluminum fluoride, sodium fluoride, sodium chloride, cryolite or the like. The added solid materials can comprise from about 10 to 200 w. percent, based on the weight of the materials which are allowed to react to form the polymerization catalysts.

The catalysts produced by the process of my invention are sensitive to poisons or deactivators such as oxygen, water, $CO_2$, sulfur or sulfur compounds, etc. Therefore the catalysts are best prepared and used under conditions under which the catalyst poisons or inhibitors are avoided insofar as is practically possible. For example, the catalysts are prepared in thoroughly dried (preferably baked-out) equipment with highly purified, substantially anhydrous solvents in the absence of air, which can be excluded by a blanket of inert gas such as hydrogen, helium, argon or the like.

The catalysts can be prepared external to the polymerization reactor or in situ. The 1-arylethylene compounds such as indene are known to form alkali metal derivatives such as 1-sodioindene upon contact with an alkali metal or other suitable alkali reagent at suitable temperatures. Thus sodium reacts with indene in the molten condition (temperatures above about 100° C.). A very reactive alkali metal such as cesium is known to add to an ethylenic double bond even at room temperature.

The 1-arylethylene compounds also react with titanium tetrachloride or other polyvalent metal salts of transition metals to form highly colored complexes which are usually solid and are insoluble at room temperature in inert hydrocarbons such as n-heptane or the like. Thus a solution of $TiCl_4$ in n-heptane, which solution is colorless or slightly yellow, reacts upon contact with indene at room temperature to form a bright red precipitate which is apparently a complex compound.

The alkali metal derivatives of the 1-arylethylene compounds are much less desirable for use in the preparation of polymerization catalysts than the free 1-arylethylene compounds or the complexes of said compounds with the polyvalent metal salts of transition metals. Obviously, formation of the alkali metal derivatives of the 1-arylethylene compounds can be avoided by the use of temperatures for catalyst preparation which are below the temperature of reaction of the alkali metal or other alkali reagent with the 1-arylethylene compound; or by first preparing complex compound of the polyvalent metal salt and 1-arylethylene compound and then adding alkali reagent; or by adding a reagent to the catalyst preparation mixture which reacts preferentially with alkali metal or other reagent, for example, n-butyl chloride, which reacts with sodium to form sodium chloride and butyl sodium; or by adding all the catalyst components at once and introducing the olefin monomer under conditions which do not favor the formation of an alkali metal derivative of the 1-arylethylene compound.

Suitable monomers for polymerization with the catalysts of the present invention are the terminal vinyl alkenes having the general formula $RCH=CH_2$ wherein R is selected from the class of hydrogen or an alkyl group containing 1 to 6 carbon atoms, inclusive, such for example, as methyl, ethyl, propyl, butyl, amyl, hexyl, isopropyl, isobutyl, t-butyl, isoamyl, neopentyl, etc. Mixtures of the aforesaid alkenes can be used in the preparation of copolymers thereof. The invention can also be applied to the homopolymerization of conjugated alkadienes containing 2 to 8 carbon atoms, inclusive, per molecule, especially 1,3-butadiene, isoprene, or reactive derivatives such as 2-chlorobutadiene-1,3 or the like. Other suitable polymerization feed stocks comprise mixtures of the aforesaid alkenes and alkadienes.

Usually the heterogeneous (solid) catalyst is suspended in an inert liquid or liquefied medium and the polymerization feed stock is brought into contact therewith as a gas, vapor, liquid or solution in an inert liquid solvent. Suitable polymerization reaction media are those inert solvents which have been disclosed above for use in the preparation of the polymerization catalysts. However, solvents or added liquid reaction media can be dispensed with, and the olefin monomer can be contacted directly, or as a gas or vapor, with the polymerization catalyst.

Polymerization can be effected at selected temperatures which vary somewhat in accordance with the polymerization activity of the specific monomer, catalyst and desired nature of the reaction product. In general, polymerization can be effected at temperatures within the range of about −20° C. to about 150° C., more often about 25° C. to about 100° C. The pressure in the polymerization reaction zone can be atmospheric or even lower, but it is advantageous to use superatmospheric pressures in order to obtain desirable monomer concentrations in contact with the catalyst. Thus, the polymerization can be conducted at pressures up to 10,000 p.s.i. or even higher pressures. Usually polymerization is effected at pressures between about 50 and about 2000 p.s.i.a.

The weight ratio of catalyst mixture to monomer can generally be varied in the range of about 0.01 to about 10% by weight, for example, about 0.1 to about 5 w. percent; even 100 w. percent catalyst can be used in flow operations.

Polymerization can be effected by contacting the olefin feed stock at the selected temperature and pressure with the mixture produced by the interaction of the catalyst components or with individual components of said mixture which exhibit catalytic activity.

Suitable agitation of the catalyst and monomer(s) is provided to secure effective contacting by means which are well known.

The contacting period in polymerization is not a critical or inventive feature and can be broadly varied from the order of one minute or even less to 30 hours, depending upon the specific mode of effecting the polymerization reaction (whether batchwise, continuously, etc.) and the yield of polymer which is desired.

The polymeric products produced by the processes encompassed within the scope of my invention can be subjected to a variety of treatments designed to remove all or part of the catalytic materials therefrom. Thus the polymers can be washed with methanol, alcoholic alkalies or acids in order to extract catalyst components.

The polymer products can be dissolved in hot solvents, for example in aromatic hydrocarbons such as xylenes, and the resultant solutions can be treated to separate polymer having a relatively low content of material derived from the catalyst component. Thus hot aromatic hydrocarbon solutions of polymer can be subjected to the action of various hydrolytic agents to precipitate metal hydroxides which can then be separated from the remaining solution by centrifuging, decantation, filtration or other means. Alternatively, the hot aromatic hydrocarbon solution of polymer can be cooled or treated with precipitants or antisolvents such as acetone, methanol or the like to precipitate a small proportion, say up to about 5 w. percent of the solute polymer, which precipitate contains a very large proportion of the inorganic materials which were originally present in the polymer. The aromatic solvent can be recovered from the aforementioned operations and can be reused.

When very high yields of solid ethylene polymers or other solid polymers, based on the weight of catalyst, are obtained according to this invention, for example yields of at least 100 or 200 grams of solid polymer per gram of catalyst, it may not be necessary for industrial purposes to remove catalyst from the polymer since its concentration by weight therein will be 1 w. percent or even less. It will be appreciated that such a low ash content in solid polymers is, for most uses of the polymers, an insignificant quantity which will not affect their utility or processing characteristics. The polymers of the present invention can be used or treated as the polymers whose preparation is described in U.S.P. 2,691,647 of Edmund Field and Morris Feller, granted October 12, 1954.

The invention is illustrated by the following examples, which are not intended to indicate its precise limits.

*Example 1*

To a magnetically-stirred glass reactor of about 100 cc. capacity were charged 50 cc. of Decalin, 2 g. (17.2 millimols) of indene and 0.43 g. (2.3 millimols) of $TiCl_4$. This corresponds to a molar ratio of indene to $TiCl_4$ of about 7.5. The charging was effected under a nitrogen gas blanket. A bright red precipitate formed in the reactor at room temperature on slight agitation of the contents. Then 0.35 g. (15.2 milligram atoms, i.e., gram atoms $\times$ 1000) of sodium dispersed in 10 cc. of Decalin was added. Ethylene was introduced into the reactor at 50 p.s.i.g. and the contents were stirred at room temperature for 23 hours. During the first 4 hours, the heat of polymerization raised the temperature in the reactor to 60° C. and the formation of a fluocculent polymer could be observed visually. Ethylene was repressured into the reactor from time to time. The reaction yielded 11.52 g. of solid white polyethylene having the density (24° C.) of 0.9402 and melt viscosity somewhat above $10^9$ poises (determined by the method of Dienes and Klemm, J. Appl. Phys. 17, 458–71 (1946)).

The above procedure was repeated except that the indene was added to the sodium in the absence of $TiCl_4$ and heated at 100° C. for 2 hours to form sodium indene, which was then cooled to room temperature. Then the $TiCl_4$ was added and reaction was carried on as before. However, the yield of polyethylene was only 1.30 g. after 19 hours of reaction.

*Example 2*

The same equipment was used as in Example 1 and the charge was 34.2 milligram atoms of the sodium dispersion, 0.863 g. (4.5 millimols) of $TiCl_4$ and 4.5 millimols of indene. A charge of 50 cc. of pure dry n-heptane solvent was used. The procedure was to add the indene to the solvent, followed by the sodium dispersion and stirring for 15 minutes at room temperature. Under these conditions no reaction was apparent between sodium and indene. Then the $TiCl_4$ was added and polymerization was effected under maximum ethylene pressure of 50 p.s.i. with ethylene reinjection from time to time, over a period of 20 hours. The reaction yielded 6.1 g. of white polyethylene having the melt viscosity of $1.35 \times 10^9$ poises, showing that a polyethylene of extremely high molecular weight was produced.

When the same reagents were employed but sodium indene was first produced, the polymerization yield was markedly reduced. Specifically, the indene was added to the heptane solvent, then the sodium dispersion was added and the mixture was heated at 100° C. to form sodium indene, following which the mixture was cooled to room temperature, $TiCl_4$ was added and ethylene was introduced at 50 p.s.i., with repressuring from time to time, over a period of 21 hours. Under these circumstances the reaction yielded only 2.31 g. of polyethylene having the density (24° C.) of 0.9726 and melt viscosity of $1.35 \times 10^9$ poises.

*Example 3*

The procedure of Example 1 was followed, except that the following were charged in the order indicated: To 50 cc. of Decalin was added 1.50 g. (14.4 millimols) of styrene followed by 0.43 g. (2.27 millimols) of $TiCl_4$. A bright orange precipitate occurred upon slight agitation. To this was added 0.35 g. (15.2 milligram atoms) of Na dispersed in 10 cc. Decalin. The yield of polymer was 4.68 g. after 23 hours. The melt viscosity was $1.7 \times 10^9$ and the density 0.9613.

*Example 4*

The reactor was a stainless steel autoclave provided with a magnetically-activated stirrup-type stirrer (Magne Dash) of 100 cc. capacity. The reactor was charged with 50 cc. of pure dry n-heptane, then 0.92 g. (40 milligram atoms) of sodium, then 1.8 g. (19.5 millimols) of n-butyl chloride, then 0.2 g. (1.9 millimols of styrene, all under a nitrogen blanket. This mixture was heated with stirring for one hour at 125° C. The mixture was then cooled to 50° C. and 0.36 g. (1.9 millimols) of $TiCl_4$ was added. The reaction temperature was maintained between 50 and 100° C. and ethylene was introduced to a pressure varying between 200 and 500 p.s.i.g., with stirring. The reactor was full of polymer and the stirrer jammed after one hour. Butyl sodium was formed by the reaction of sodium with butyl chloride, so that direct reaction of sodium with styrene was avoided during the initial heating period. This polymerization yielded 19.9 g. of polyethylene whose density (20/4° C.) was 0.9353 and melt viscosity was $1.5 \times 10^9$ poises.

*Example 5*

The procedure in Example 1 was followed, except that the following were charged: To 50 cc. of n-heptane were added 2.0 g. of indene followed by 0.40 g. of $VCl_4$. A bluish-purple precipitate occurred to which were added 0.35 g. sodium dispersed in 15 cc. of n-octane. Solid polymer was recovered after 23 hours of reaction time.

*Example 6*

The process of Example 1 is repeated but an equimolar proportion of $MoCl_5$ is substituted for $TiCl_4$. The resinous polyethylene product is worked up as before.

*Example 7*

The process of Example 1 is repeated but an equivalent proportion of sodium hydride is substituted for sodium and the resinous polyethylene is worked up as before.

Having thus described my invention, what I claim is:
1. A process for the polymerization of ethylene to a normally solid polyethylene which comprises reacting ethylene under polymerization conditions including a temperature between about 25° C. and about 100° C. and superatmospheric pressure in an inert hydrocarbon solvent with a catalyst prepared by (1) reacting a metal chloride selected from the group consisting of $TiCl_4$ and $VCl_4$ with a 1-aryl ethylene hydrocarbon selected from the group consisting of styrene and indene at ambient temperature in a molar ratio of said hydrocarbon to said metal chloride between about 1 and about 10 to form a reaction product, (2) reacting said reaction product with an alkali metal, the molar ratio of said alkali metal to said metal chloride being between about 0.1 and 10 and separating a normally solid polyethylene so produced.

2. The process of claim 1 wherein said 1-arlyethylene hydrocarbon is styrene, said alkali metal is sodium and said metal chloride is titanium tetrachloride.

3. The process of claim 1 wherein said 1-arylethylene hydrocarbon is indene, said alkali reagent is sodium and said metal chloride is titanium tetrachloride.

References Cited in the file of this patent

UNITED STATES PATENTS

| | | |
|---|---|---|
| 2,827,446 | Breslow | Mar. 18, 1958 |
| 2,827,447 | Nowlin | Mar. 18, 1958 |
| 2,843,577 | Friedlander | July 15, 1958 |
| 2,850,488 | Baxter et al. | Sept. 2, 1958 |
| 2,879,263 | Anderson et al. | Mar. 24, 1959 |

FOREIGN PATENTS

| | | |
|---|---|---|
| 1,132,506 | France | Nov. 5, 1956 |
| 1,137,459 | France | Jan. 14, 1957 |
| 1,144,316 | France | Apr. 23, 1957 |